United States Patent Office 3,162,109
Patented Dec. 22, 1964

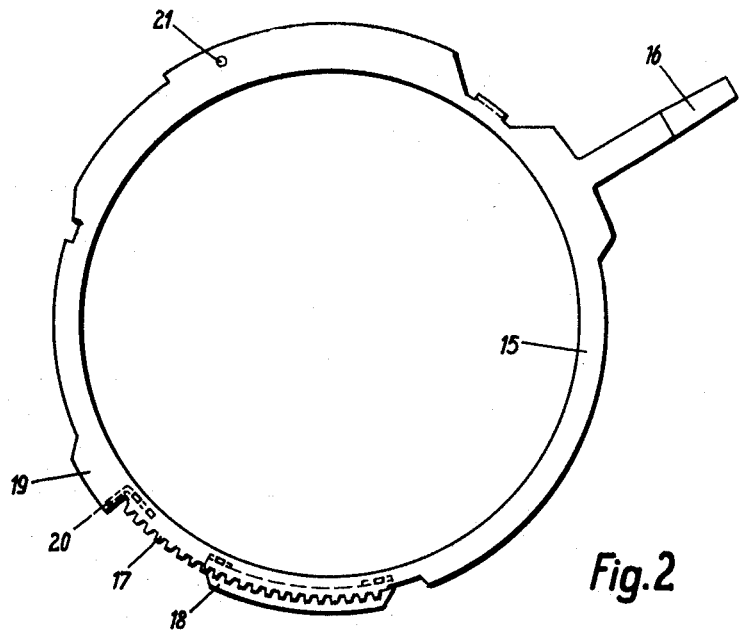
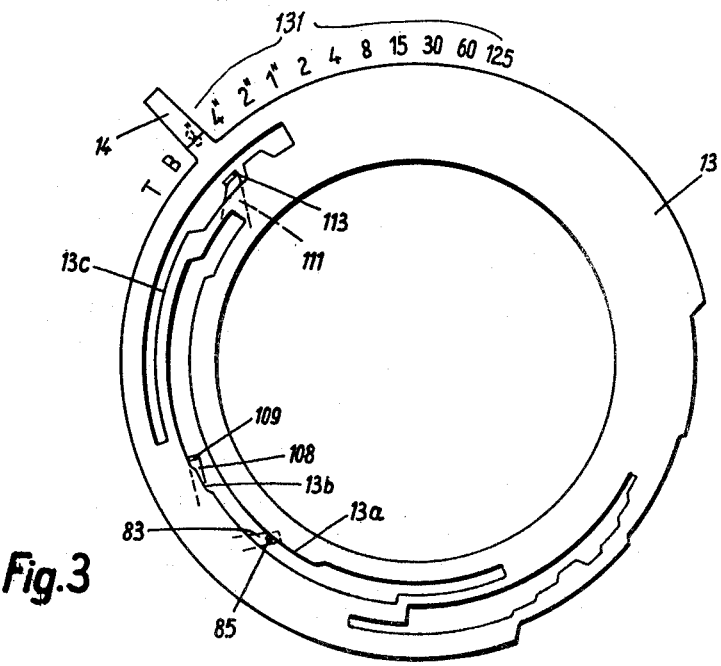

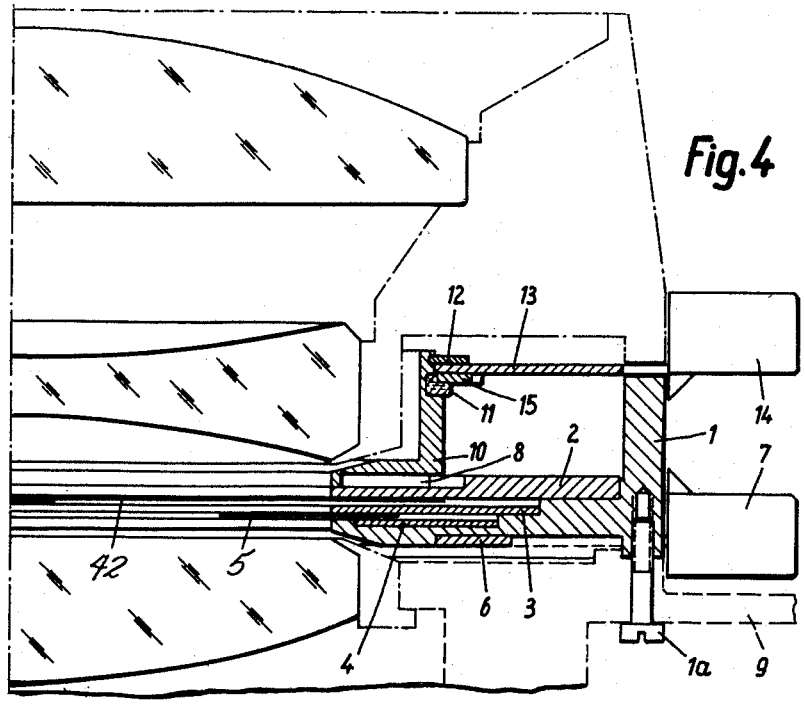
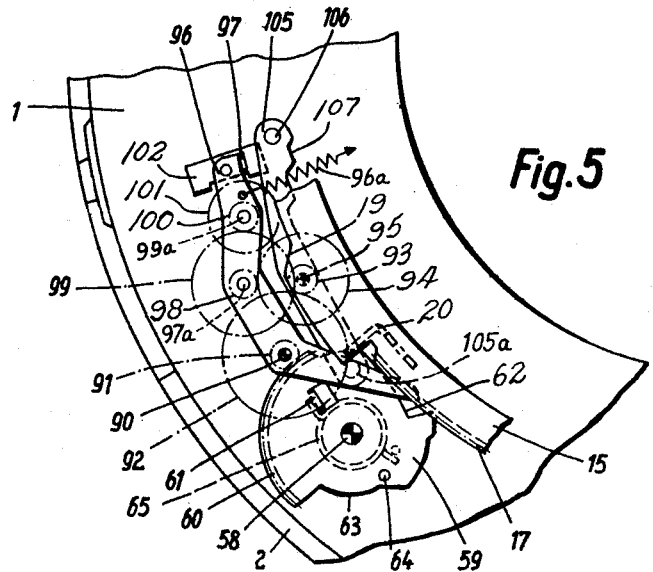

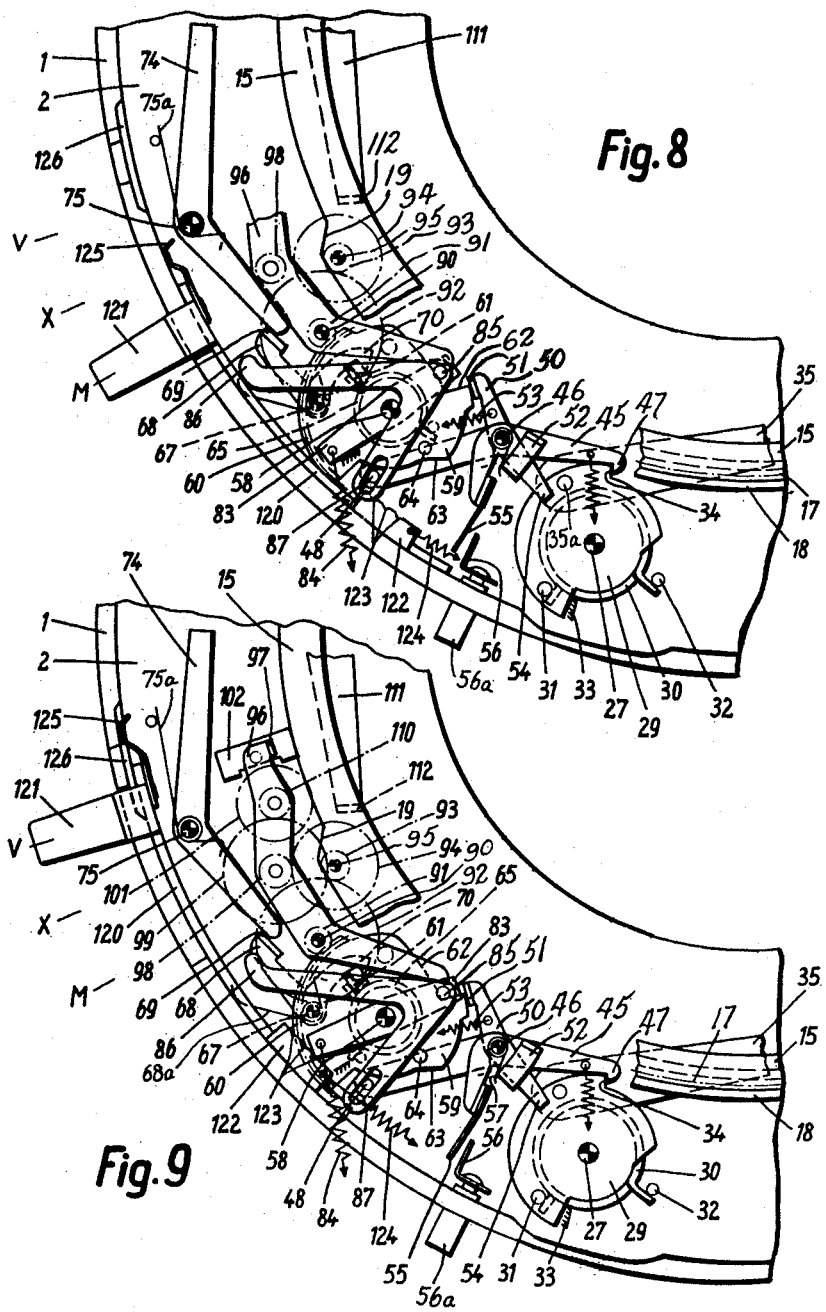

3,162,109
PHOTOGRAPHIC SHUTTER
Franz Singer and Herbert Benninger, Munich, Germany,
assignors to Compur-Werk G.m.b.H. & Co., Munich,
Germany, a firm of Germany
Filed Oct. 5, 1962, Ser. No. 229,284
Claims priority, application Germany, Oct. 6, 1961,
C 25,219
7 Claims. (Cl. 95—11.5)

This invention relates to a photographic shutter, and more particularly to retarding mechanism for a photographic shutter of the objective type, sometimes called a central shutter or a between-the-lens shutter, as distinguished from a focal plane shutter or curtain shutter.

An object of the invention is the provision of a generally improved and more satisfactory shutter of the objective type.

Another object is the provision of generally improved and more satisfactory retarding means or mechanism for a shutter of the objective type.

Still another object is the provision of retarding mechanism so designed and constructed that it may be selectively set for performing the three different functions of (a) delaying the beginning of the exposure for several seconds after the operation of the shutter release, to enable the photographer to shift his position to get into the picture; (b) slightly delaying the beginning of the exposure for a fraction of a second after the operation of the shutter release, so as to synchronize the exposure with the maximum intensity of illumination from a flash bulb; and (c) increasing the duration of the exposure by a variable time up to several seconds, thus enabling the making of internally timed or automatically timed exposures having a duration much greater than those obtainable with conventional shutters of the objective type.

A further object is the provision of retarding mechanism capable of performing the functions just mentioned, so designed and constructed that it will fit within the limited space available in a conventional casing of a conventional objective shutter, without requiring the casing or housing to be any larger than that of a comparable shutter which does not perform these functions.

Some of these objects have heretofore been achieved in shutters of the focal plane or curtain type, but so far as now known these objects have not heretofore been satisfactorily achieved in any shutter of the objective type.

These and other desirable objects may be attained in the manner disclosed as an illustrative embodiment of the invention in the following description and in the accompanying drawings forming a part hereof, in which:

FIG. 2 is a front face view of a shutter tensioning or cocking ring, removed from the rest of the shutter, on a somewhat smaller scale than FIG. 1;

FIG. 3 is a face view of the shutter speed control ring, on the same scale as FIG. 2, with most of the other parts omitted;

FIG. 4 is a fragmentary radial section through the shutter, taken on an axial plane, on substantially the same scale as FIG. 1;

FIG. 5 is a fragmentary front view similar to a portion of FIG. 1, showing part of the retarding mechanism and part of the associated tensioning or cocking member, in a somewhat simplified form;

FIG. 8 is a view similar to FIG. 7 but with the parts set to operate as a flash bulb synchronizer; and FIG. 9 is a similar view with the parts of the retarding mechanism set to operate as a delayed action release.

In all of the views, the construction is illustrated in a somewhat simplified and partially schematic form, for clearer understanding, with many of the parts not necessary to an understanding of the invention being wholly or partially omitted.

Figure 1:
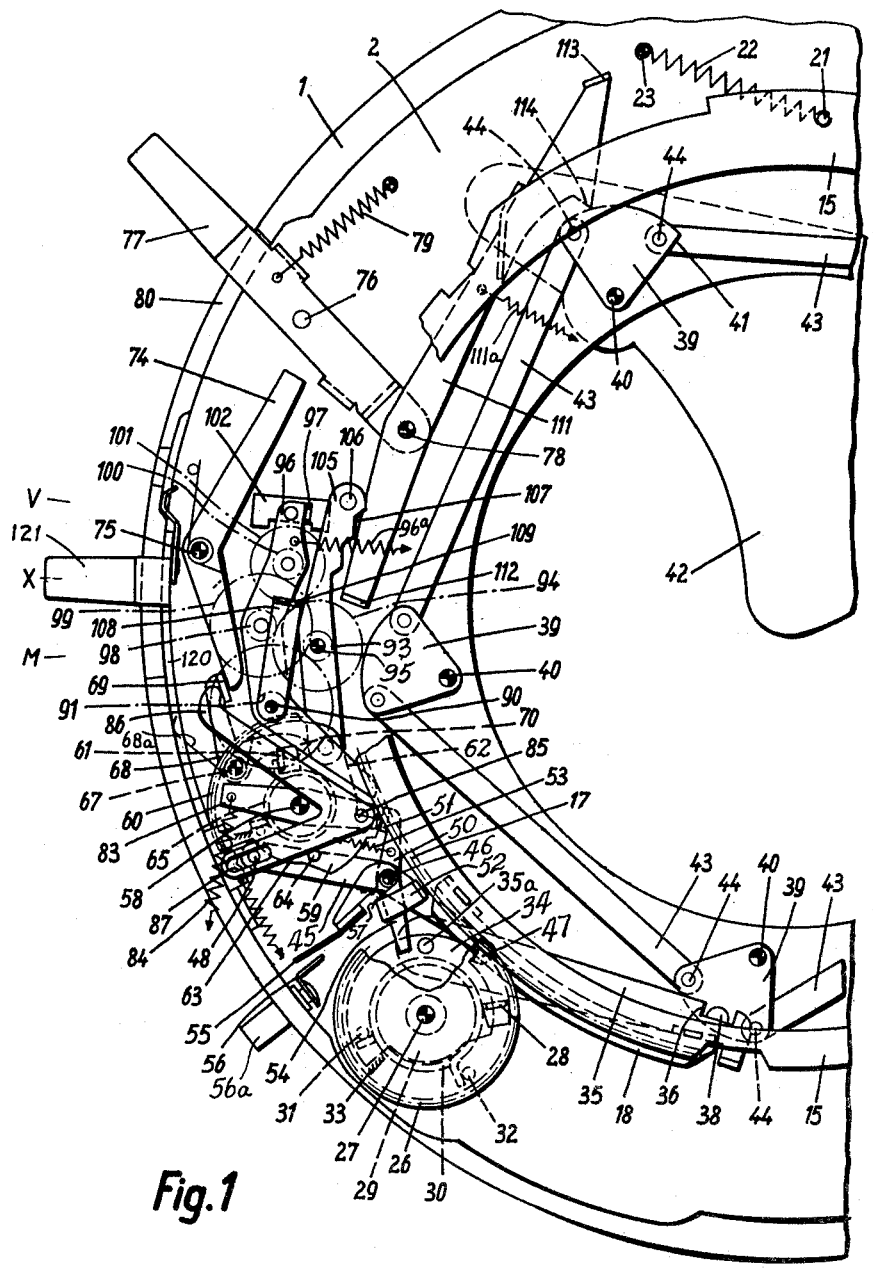
FIG. 1 is a fragmentary front face view of a shutter in accordance with a preferred embodiment of the invention, with the front cover plate and other parts omitted for better showing of the remaining parts, the shutter being shown in cocked or tension position ready for an exposure.

Referring first to FIGS. 1 and 4, the preferred form of the shutter includes a shutter housing or casing of the annular type customarily used in objective shutters, indicated in general at 1, the annular portion of the shutter containing the usual mechanism mounting plate or base plate 2 suitably fastened by bolts or screws to the main member of the housing. In an annular space between the back wall of the housing and the plate 2, there is a diaphragm bearing ring 3, likewise suitably fastened to the housing, and a diaphragm actuating ring 4 which is rotatable in an annular groove in the front face of the back wall of the housing, rotating about the optical axis of the shutter as a center. The optical axis, as usual extends through the center of the exposure aperture perpendicular to the plane of the paper in all views except FIG. 4.

Between these two rings 3 and 4 are the diaphragm leaves 5 which are pivoted in conventional manner to the ring 3 and which carry pins engaging in cam slots of conventional form in the ring 4, so that rotation of the diaphragm actuating ring 4 will cause swinging of the diaphragm leaves about their pivots, to vary the aperture of the diaphragm. The ring 4 is suitably connected in conventional manner for common rotation with the diaphragm setting ring 6 which is rotatable (about the optical axis as a center) on a shoulder at the rear of the casing 1, as for example by manual force exerted on a finger piece 7 operatively connected to the ring 6.

The exact structure of the diaphragm and the manner of operating the same are not important for purposes of the present invention, and what has been said above about the diaphragm is stated merely by way of example of a possible construction. As the description of the present invention proceeds, it will be apparent that the retarding mechanism of the present invention does not depend in any way on the details of the diaphragm, so that the present invention can be used with shutters having any type or style of diaphragm, whether set manually or automatically.

The shutter housing 1 is attached by screws 1a to the front wall of the body of the camera with which the shutter is used, a fragment of such wall being schematically shown at 9 in FIG. 4. A tube 10, concentric with the optical axis, is secured by bolts or screws within the casing 1, extending forwardly from the mechanism plate 2 as seen in FIG. 4. The mechanism plate contains suitable recesses 8 for accommodating various parts of the shutter mechanism. An external groove extending circumferentially around the tube 10 a little to the rear of its forward end contains a ring 11, preferably of plastic material having a low coefficient of friction with metal. A tensioning or cocking ring 15 is rotatably mounted on a shoulder of the anti-friction bearing ring 11, and a shutter speed setting ring 13 is located just in front of the ring 15 and rotatable concentrically with it on a suitable bearing surface on the tube 11. In front of the ring 13 is a split ring 12 engaged in a circumferential groove on the tube 11 close to its front end, serving to hold both of the rings 13 and 15 against axial displacement.

The speed setting ring 13, best shown in detail in FIG. 3, is formed with a manipulating arm 14 which extends out through a suitable slot in the casing to an externally accessible position, and it has cam slots provided with circumferentially extending cam surfaces 13a, 13b, and 13c. As indicated somewhat schematically in FIG. 3, and as will be further apparent as the description proceeds, the cam surface 13a cooperates with a pin 85 on a selector lever 83; the cam 13b cooperates with an ear or lug 109 on a control lever 108; and the cam 13c cooperates with an ear or lug 113 on an intercepting lever 111.

The tensioning or cocking ring 15 is best shown in FIG. 2. It has a manipulating arm 16 which extends out through a suitable slot in the casing to an accessible external position. Part of its periphery is formed with gear teeth 17 which, as further explained below, mesh with the teeth of a pinion 26. The tensioning ring also has a cam portion 18 for cooperation with a portion 52 on a control lever 50, and it has a second cam portion 19 which cooperates with a portion 97 on a lever 96, all as described below. Also the tensioning or cocking ring 15 has an abutment portion or entraining member 20 which engages a pin 106 on an arm 105, as further described below, during the tensioning or cocking movement of the ring 15, to move this arm 105 to tension or cock a portion of the gear train of the retarding mechanism. A restoring spring 22 (FIG. 1) is attached at one end to a pin 21 on the tensioning ring 15, and at the other end to a fixed pin 23 on the base plate 2, urging the tensioning ring 15 in a counterclockwise direction to a normal rest position.

A pinion 26 is rotatably mounted on a pivot pin 27 secured to the plate 2, in position to mesh with the gear teeth 17 on the ring 15. The pinion carries a downwardly extending or rearwardly extending ear 28 to entrain a driving risk or master member 29 which is likewise rotatable on the pivot pin 27, to the rear of or below the pinion 26. In this description, directional terms such as above, below, front, rear, etc., are used merely for convenience of description and to enable quick understanding of the construction. Obviously the shutter and the camera to which it is attached may be held in any desired position of orientation, so that what is here described as below some other part, may actually be above it in some positions of holding the camera. But for convenience of description, it is assumed that the shutter is laid flat on its back, with the optical axis vertical and with the front cover of the shutter (not shown) at the top thereof. This constitutes a convenient position of reference for purposes of the description. Also, in this description, a rotary motion described as clockwise means clockwise when viewed from a position in front of the shutter, this being the viewing position illustrated in all views except FIG. 4.

Figure 6:
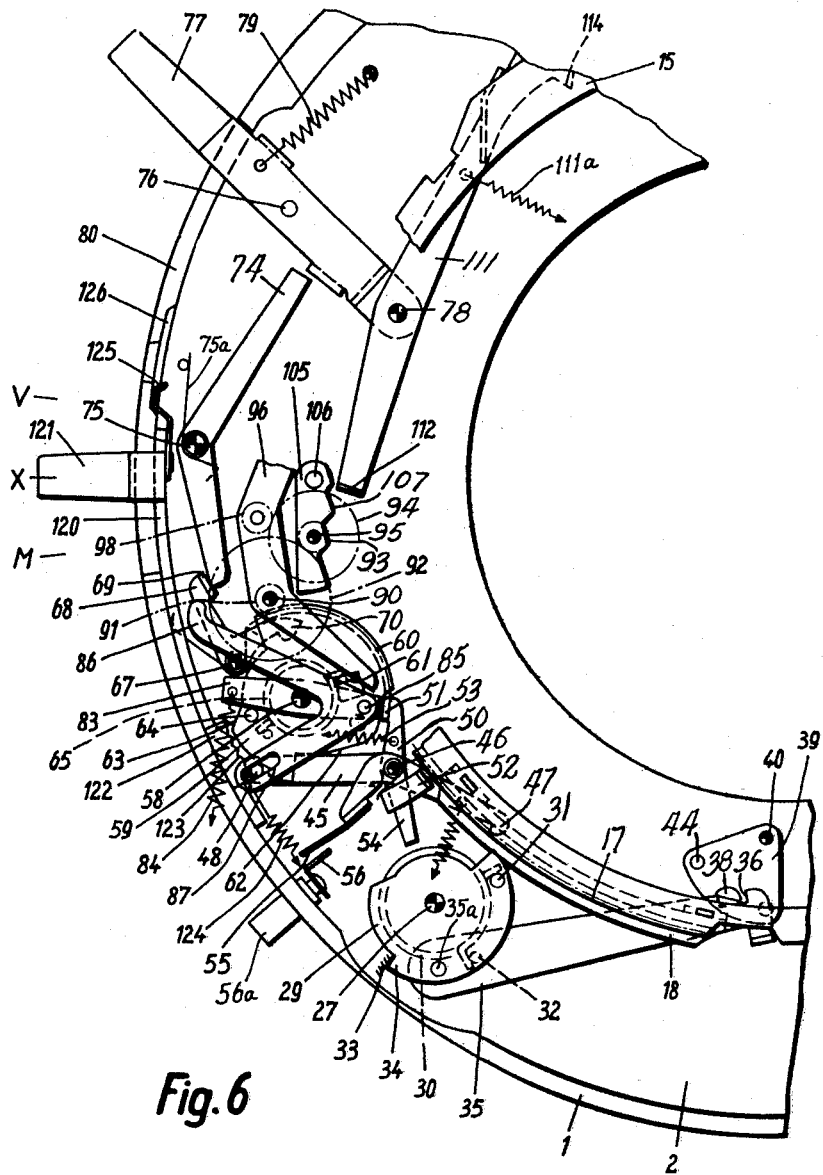
FIG. 6 is a view similar to a portion of FIG. 1, but somewhat simplified, showing the parts in the run-down or rest position which they assume at the conclusion of one exposure and before they are tensioned or cocked ready for the next exposure.

The driving disk or master member 29 has a pin 31 in position to be engaged by the ear 28 on the pinion 26 when the pinion is turned during a tensioning operation. This pin 31 also forms an anchorage for one end of the main driving spring or master spring 30 which is coiled concentrically around the pivot pin 27, the other end of the spring being held by a fixed pin 32 mounted on the plate 2 or other suitable stationary part of the construction. The rest or run-down position of the master member 29 is determined by engagement of a fixed or stationary abutment 33 in the shutter housing with an abutment 34 on the master member. This run-down or rest position of the parts is shown in FIG. 6.

A shutter blade operating link 35 has one end pivoted to the master member disk 29 by the pivot pin 35a. The other end of the link has a claw notch 36 for engagement with a pin 38 attached to one of several quadrant-shaped cranks 39, each of which is fixed to a pivot pin 40 rotatable in the mechanism plate 2. One of these quadrant-shaped cranks has a special abutment face 41, for engagement under certain conditions with a portion 114 on an intercepting lever 111 as further described below. Each of the pins 40 is fixed to a shutter blade 42, so that as the quadrant 39 and pin 40 turn, its associated shutter blade 42 turns with it, swinging from closed position to open position or vice versa. Thus the number of quadrant members 39 and pins 40 is equal to the number of shutter blades, and any desired number of such blades may be used, only one of them being shown in FIG. 1 for clarity of illustration. Usually about five shutter blades are employed, but the exact number is immaterial for purposes of the present invention. All of the pins 40 are operatively connected to each other to swing in unison, by means of links 43, each link having its opposite ends connected by pivot pins 44 to two adjacent cranks 39, as seen in FIG. 1.

The main latch of the master member 29, holding it in cocked or tensioned position until the instant that the exposure is to begin, is shown at 45 (see especially FIGS. 1 and 6) and is pivotally mounted intermediate its length on a pivot pin 46 mounted on the mechanism plate 2. One end of the latch is provided with a hook portion 47 for engaging the abutment portion 34 on the master member 29. The opposite end of the latch member carries an upstanding pin 48 engaging in a slot 87 of a bellcrank lever 86 as further described below. A biasing spring (not shown) tends to turn the latch member 45 in a clockwise direction on its pivot 46.

Likewise pivotally mounted on the same pivot 46 is a control lever 50, having one end formed with an angled tooth or ear 51, and the other end formed with a Z-shaped portion 52. The Z-shaped portion 52 has at one end a downwardly bent ear, and at the other end an upwardly bent ear. A biasing spring 53 tends to swing the control lever 50 in a counterclockwise direction on the pivot 46. There is also a switch contact lever 54 pivotally mounted on the same pivot pin 46. One end of the lever projects into the path of the pin 31 on the master member or driving disk 29. The other end of the contact lever 54 carries a somewhat resilient metallic contact blade 55 for making electric contact with the electric switch member 56 mounted in fixed position on the side wall of the casing. The switch contact 56 is suitably insulated from the casing, whereas the movable switch member 55 is electrically connected to the casing. The usual conventional electrical conductors (not shown) go from the fitting or socket 56a on the shutter casing to the conventional flash lamp and the conventional source of electric current, such as a battery. As well understood in the art of so-called synchronized shutters, the contact of the switch parts 55 and 56 with each other will thus close the electric circuit to connect the flash lamp to the source of current, to initiate the flash illumination.

A hairpin spring 57, mounted on the pivot pin 46, reacts against the contact lever 54 to tend to turn it in a clockwise direction on the pivot pin, thus tending to keep the switch parts 55, 56 in their open position. The other end of the hairpin spring is supported from the downturned ear of the Z-shaped portion 52 of the lever 50, and this down-turned ear also serves as an abutment engaging one edge of the switch contact lever 54 to limit the extent of swinging thereof in a clockwise direction.

Another pivot pin 58, securely fitted into the mechanism mounting plate 2, serves as a pivot for rotatably mounting a cam disk 59, shown in several of the views but the shape of which is best seen in FIG. 5. This cam disk 59 has a toothed segment 60 extending around part of its periphery, and also has a downwardly struck ear or lug 61, and a cam edge portion 62 for cooperation with the previously mentioned ear or tooth 51 on the control lever 50, and another cam edge 63 for cooperation with the previously mentioned pin 48 on the latch lever 45. The cam disk 59 also carries an upwardly projecting entraining pin 64 which cooperates under certain conditions with the edge of a selector lever 83 as further described below.

The cam disk 59 is urged in a clockwise direction by a coiled driving spring 65, coiled around the pivot 58 of the disk, one end of the spring having a fixed anchorage and the other end bearing against the ear or projection 61 on the cam disk. A pivot pin 67 fixed to the mounting plate 2 forms a bearing for a latching pawl 68 which is urged in a clockwise direction by the spring 68a. One end of this latching pawl has an upwardly extending ear 69 for cooperation with the release lever 74 and with the bellcrank lever 86 as further described below. The other end of the latching pawl 68 has a latching tooth 70 for cooperation with the lug or ear 61 on the cam disk 59 to retain the cam disk in tensioned or cocked position, preventing clockwise running-down rotation of the cam disk until the latching tooth 70 is released. The latching tooth 70 is appropriately shaped so that only a slight amount of movement of the latching pawl 68 in a counterclockwise direction on its pivot 67 is needed for releasing the lug 61, and then as the cam disk 59 turns in a clockwise direction, the action of the lug 61 will deflect the latching pawl 68 still further in a counterclockwise direction.

There is a two-armed intermediate release lever 74 pivotally mounted on a pivot pin 75 fixed to the mechanism mounting plate 2 and urged in a clockwise direction by a hairpin spring 75a. One arm of this lever (the lower arm when viewed as in FIG. 1) bears against the above mentioned upstanding ear 69 on the latching pawl 68. The other arm (upper arm when viewed as in FIG. 1) of the two-armed lever 74 cooperates with a pin 76 on the external release lever 77 mounted on a pivot 78 fixed to the mounting plate 2. A restoring spring 79 has one end secured to a fixed anchorage and the other end secured to the lever 77 to tend to turn the lever in a clockwise direction on its pivot 78. The lever extends out through a circumferential slot 80 in the side wall of the shutter casing 1, the length of the slot determining the range of pivotal movement of the release lever. The outer end may be manipulated by the finger of the operator, or by any known form of releasing means, to initiate a cycle of operation of the shutter. When the release lever 77 is swung in a counterclockwise direction on its pivot 78, against the restoring force of the spring 79, the pin 76 thereon engages against the outer edge of the upper arm of the lever 74 and swings the lever 74 in a clockwise direction, so that the lower arm thereof presses against the ear 69 on the latching pawl 68 and swings this latching pawl in a counterclockwise direction on its pivot 67, as further described below in connection with the explanation of the operation of the construction.

A selector lever 83 is pivoted near its mid-point on the pivot 58, above the cam disk 59. The lever has arms or ends which extend approximately diametrically in opposite directions from the pivot 58. A biasing spring 84 tends to turn the selector lever 83 in a counterclockwise direction on the pivot 58. One end (the righthand end, when viewed as in FIGS. 1 and 6) of the selector lever 83 is arranged to cooperate with the control lever 50 in a manner further described below. This same end of the selector lever 83 carries an upstanding pin 85 which serves the double purpose of bearing against the cam edge 13a of the control ring 13, and also serving as a pivot for the bellcrank lever 86. One end of the bellcrank lever is slotted at 87, and the pin 48 on the latch member 45 is engaged in this slot. The other arm of the bellcrank lever 86 is in a position to engage the ear 69 on the latch lever 68 in certain positions of adjustment, as shown for example in FIG. 1, although it is out of contact with the ear 69 in certain other positions of adjustment as shown, for example, in FIGS. 7-9. When the parts are adjusted so that the end of the bellcrank lever 86 is engaged with the ear 69, it is seen that this provides a direct operative connection between the latch 45 and the intermediate release lever 74, since clockwise swinging of the lever 74 on its pivot 75 will press leftwardly against the righthand surface of the upstanding ear 69, and the lefthand surface of this same ear 69 will press leftwardly on the end of the bellcrank lever 86, swinging the bellcrank counterclockwise on its pivot 85, so that the slot 87 of the bellcrank, engaging the pin 48, will swing the latching pawl 45 counterclockwise on its pivot 46, releasing the latching nose or tooth 47 from the retaining abutment portion 34 of the master driving member or disk 29. This provides for direct release of the master member latch 45, under certain conditions of adjustment, in a manner to by-pass the member 59, which is the first rotary member of the gear train constituting the retarding mechanism or retarding means. Under other conditions, however, as will be further explained below, the master member latch 45 is not released directly from the operation of the parts 74 and 69, but is released only through the rotary action of the member 59 of the retarding mechanism.

Further elements of the retarding mechanism will now be described, referring especially to FIGS. 1 and 5. On a pivot pin 90 fixed to the mounting plate 2 there is rotatably mounted a pinion 91 meshing with the toothed portion 60 of the cam disk 59. This pinion 92 is integral with or at least suitably coupled to a gear wheel 92 rotatable on the same pivot 90, which gear wheel, in turn, meshes with a pinion 93 and an integral or coupled gear wheel 94 both mounted on the pivot pin 95 fixed to the mounting plate 2.

A two-armed lever 96 is pivotally mounted on the same pivot pin 90 above mentioned, and is biased by a spring 96a tending to swing this lever in a clockwise direction on the pivot, until it engages with a fixed stop (not shown). At the free end of the lever 96 is an upstanding ear or lug 97 arranged to cooperate at appropriate times with the previously mentioned cam 19 (FIG. 2) on the shutter tensioning or cocking ring 15. The lever 96 also carries a pivot pin 97a, on which is rotatably mounted a pinion 98 and a gear wheel 99 integral with or suitably coupled to the pinion. A second pivot pin 99a on the lever 96 serves as a bearing for the pinion 100 in meshing engagement with the gear wheel 99, and for an escapement wheel or star wheel 101 fixed to the pinion 100 to rotate therewith. The teeth of the escapement wheel engage in the conventional manner with a vibrating anchor or pallet 102 pivotally mounted on the lever 96 near the free end thereof. The parts are so arranged that when the lever 96 is in its clockwise limit position, held against the fixed stop by the spring 96a, then the pinion 98 is in meshing engagement with the gear wheel 94 on the fixed pivot 95. When, however, the lever 96 is swung in a counterclockwise direction on its pivot 90, against the force of the spring 96a, the pinion 98 is moved out of engagement with the gear wheel 94, thus breaking or inactivating the retarding gear train at this point, although the gear members 99 and 100 constantly remain in meshing engagement with each other, and the gear members 60, 91, 92, 93 constantly remain in meshing engagement with each other.

Pivotally attached to the cam disk 59 by means of a pin 105a (FIG. 5) is an arm 105 (FIGS. 1 and 5) carrying at its free end an upstanding pin 106 in position to be engaged, during a shutter tensioning or cocking operation, by the entraining member 20 (FIG. 2) on the tensioning ring 15. Near this pin 106, on the inner edge of the arm 105 (that is, the edge closer to the center or optical axis of the shutter) there is a cam formation 107 providing three steps for cooperation with a lug 112 as further described below. On the previously mentioned stationary pin 90, there is pivotally mounted a control lever 108 (FIG. 1) which has at its free end an upstanding lug or ear 109, the left or outer edge of which cooperates with the cam portion 13b of the speed setting ring 13, as already mentioned in connection with FIG. 3, while the righthand edge of this same ear 109 engages the left or outer edge (outermost with respect to the center of the shutter) of the arm 105, as seen in FIG. 1. A biasing spring (not shown) constantly tends to swing the arm 105 in a counterclockwise direction relative to its pivot 105a, thus keeping the left edge of the lever 105 engaged with the right edge or abutment portion 109 of the control lever 103, and likewise keeping the control lever engaged with the cam portion 13b of the speed control ring 13.

Mounted on the same pivot 78 on which the release lever 77 is mounted, there is a two-armed intercepting lever 111, urged in a clockwise direction relative to its pivot 78 by a biasing spring 111a. One arm of this lever 111 has a lug or ear 112 for cooperation with the cam edge 107 of the member 105. The other end of the lever 111 has an upstanding lug or flange 113 for cooperation with the cam portion 13c of the speed control ring 13 (see FIG. 3) and near this lug 113 it has a hook-like abutment portion 114 (FIG. 1) for engagement at appropriate times with the edge or face 41 of one of the quadrant cranks 39. When the shutter blades swing to their fully open positions, the abutment or hook 114 may or may not engage with the edge 41 to hold the blades fully open, depending upon the position of the cam edge 13c relative to the upstanding lug or ear 113 at this particular time.

Referring now to FIGS. 1 and 6–9, there is a selector slide 120 mounted for sliding movement in a circumferential direction on the inner face of the outer side wall of the shutter casing 1. This slide member 120 is operated manually by means of a finger grip portion or handle 121 which projects radially outwardly through a slot in the side wall of the casing. Suitably marked on the casing or on some part appropriately associated therewith, is a scale with the conventional designations M, X, and V, which are read in conjunction with a suitable index mark or reference point on the slide 120, the handle 121 itself conveniently serving for this reference mark. These markings have the conventional meaning well understood in the shutter art. When, for example, the handle 121 or other suitable reference mark is opposite the graduation X, this indicates that the shutter is set for synchronization of the instantaneous or no-lag kind, where the electric impulse for initiating the flash need not be given until the shutter blades are fully open, since the flash occurs instantly when the electric circuit is closed, without any lag or delay. When the selector slide 120 is moved to the position indicated by the scale marking M, this indicates that the mechanism is set for synchronizing the shutter exposure with maximum brillance of flash from a conventional flash bulb of the common type wherein the maximum brillance of flash comes at a time lag in the neighborhood of 17 or 20 milliseconds after the closing of the electric switch in the flash circuit. When the selector member 120 is set at the position indicated by the scale marking V, this indicates that the mechanism is set for what is sometimes called a pre-timer operation, the beginning of the actual exposure being delayed for some seconds after the release of the shutter, to allow time for the operator to release the shutter and then get into the field of view of the camera so that he will appear in the picture. In the present construction, the X position is the central or intermediate position of the selector ring 120, the V position being the limit position of the selector slide in a clockwise direction relative to the optical axis, and the M position being the limit position in the opposite or counterclockwise direction relative to the optical axis.

Near one end, the slide member 120 carries on its inner face a cam member 122 provided with notches 123 for engaging, at times, the adjacent end of the selector lever 83 as further described below. A restoring spring 124 urges the slide 120 in a counterclockwise direction with reference to the optical axis. A spring catch 125, engaging in a circumferentially elongated notch or recess 126 in the wall of the shutter casing, prevents the slide from moving in the counterclockwise direction beyond its central or X position, except by exertion of more force in this direction than can be exerted by the spring 124. In other words, the length of the recess 126 is such that the slide may move relatively freely between X position and V position, and the force of the spring 124 is sufficient to move the slide back automatically from V position to X position unless such movement is restrained by other means. But in the X position, the spring catch 125 is engaged with one end of the recess 126, and manual force must be applied to the handle 121 to spring the catch 125 out of the end of the recess 126, to permit the slide to move to M position.

The retarding mechanism and associated parts as herein disclosed are capable of controlling or affecting the operation of the photographic shutter in three different ways. The particular way in which the shutter will operate during the making of any given exposure is determined by the respective positions of the speed setting ring 13 and of the selector slide 120. The retarding mechanism may operate (a) as a pre-timer or delayed-action release; or (b) as a synchronizer for the above mentioned M type of synchronization for use with flash bulbs having a timer lag; or (c) as a timing mechanism for producing automatically timed or internally timed exposures longer than those obtainable with conventional objective shutters, so that an internally timed or automatically timed exposure can be made with a duration which previously could be obtained only by external or manual timing, using what has heretofore been called a "bulb" exposure or a "time" exposure.

Since this is an important feature of the present invention, enabling the production of exposures of several seconds duration by internally or mechanically timed means rather than by externally or mechanically timed means, it seems desirable at this point to explain the nomenclature employed. As well known to those familiar with modern shutters of the objective type, the longest duration of internally or mechanically timed exposure which has heretofore been possible with objective shutters currently available on the market, is a duration of one second. Exposures having a duration of one second or less have often been generically called instantaneous exposures, and as above explained they have normally been timed by the internal mechanism of the shutter, operating with various known forms of delaying or retarding mechanism settable selectively to produce various different shutter speeds (that is, various durations of exposure). The need for making exposures of duration longer than one second has been relatively rare, and it has been sufficient for practical purposes to make longer exposures with manual or external control of the exposure, using the conventional "bulb" or "time" setting arrangement of the shutter. The actual time of exposure cannot be controlled very accurately or precisely, when it is done manually, but it has usually been sufficiently accurate for practical purposes, especially when taking black and white pictures, in view of the latitude of black and white film.

However, with the great increase in color photography in recent years, there has been an increasing need for exposures of longer duration than one second, because of the slower speed of color film as compared with black and white film, necessitating longer exposures when taking photographs of subjects in rather dim lighting. At the same time, there is an increasing need for more accurate control of the duration of the exposure, because of the relatively narrow latitude of color film as compared with the wider latitude of black and white film. Hence it has become very desirable, especially in color photography, to provide a shutter which can be used for exposures longer than one second, and also to time such exposures by internal mechanical means, thus producing an exposure of accurate predictable duration rather than a manually timed exposure which may vary considerably from the intended theoretical length.

Because a duration of one second has heretofore been the usual dividing line between automatically or internally timed exposures, on the one hand, and the manually controlled "time" exposures on the other hand, there is a tendency in some quarters to speak of an exposure longer than one second as a "time" exposure, regardless of whether it is automatically timed by the internal mechanism of the shutter, or whether it is timed by external manual means. It is believed, however, that clear understanding will be promoted and confusion will be minimized, if the words "time exposure" are confined to an exposure the duration of which is externally controlled by manual means, using either the conventional B or "bulb" setting or the conventional T or "time" setting of the shutter mechanism, and if all internally or automatically timed exposures (that is, those whose duration is determined by the operation of the mechanical parts of the shutter) are generically called "instantaneous" exposures even though their duration may be more than one second. Those having a duration of more than one second could be called "extended" exposures or "long" exposures, if desired, to indicate that they are longer than the heretofore conventional instantaneous exposures, but at the same time to avoid calling them time exposures, so as to obviate the possibility of confusion with heretofore conventional time exposures timed by external manual means rather than by internal mechanical means.

Referring now to the operation of the shutter, the tensioning or cocking of the shutter is performed in the same way, regardless of which of the three kinds of exposure is to be made. The tensioning is performed by manual rotation of the tensioning ring 15 in a clockwise direction, by finger pressure applied to the handle 16. During the first part of the tensioning movement, from the rest or run-down position shown in FIG. 6, the cam edge 18 on the ring 15 strikes the upstanding ear or lug on the Z-shaped member 52 on the control lever 50, and deflects the control lever clockwise slightly, retaining it in this deflected position during the remainder of the clockwise tensioning motion of the ring 15 and until the ring 15 has been restored backward in a counterclockwise direction almost to its rest position. This holding of the control lever 50 by the cam 18 prevents the control lever from being deflected counterclockwise by its spring 53, during the subsequent counterclockwise rotation of the cam disk 59, and thus prevents undesired closing of the synchronizer switch 55, 56 during the tensioning operation.

During further clockwise tensioning movement of the tensioning ring 15, the gear teeth 17 thereon cause counterclockwise rotation of the pinion 26, so that the ear 28 thereon engages the pin 31 of the master member or driving disk 29, to rotate the master member counterclockwise against the resistance of the main driving spring 30, thus winding up or tensioning this spring 30. This counterclockwise rotation of the master member will cause movement of the blade driving link 35 from the position shown in FIG. 6 to the position shown in FIG. 1, but will not result in any movement of the shutter blades because the claw notch 36 of the link 35 is so shaped that when it starts from the position shown in FIG. 6 and moves rightwardly from such position, it will slip past the driving pin 38 without causing movement of the pin, and the edge of the link to the left of the claw notch 36 will ride along the side of the pin. When the link 35 is in the tensioned position shown in FIG. 1, however, it is apparent that rightward movement of the link from this starting position will positively engage the pin 38 and will shift the pin 38 rightward, to open the shutter blades. It will be understood, of course, that the extent of tensioning movement and running-down movement of the master member 29 is approximately one-half of a complete revolution, and that in both of the limit positions of the master member (fully tensioned or fully run-down) the link 35 is in its extreme leftward position. When the master member reaches its fully tensioned position, the hook or tooth 47 of the latch member 45 will drop into engagement with the abutment face 34 of the master member, to retain the master member in the tensioned position. In the course of the clockwise rotation of the tensioning ring 15, the cam 19 thereon will strike the ear 97 on the lever 96, to deflect this lever counterclockwise on its pivot 90, thus moving the pinion 98 out of meshing engagement with the gear wheel 94, so that the major part of the resistance of the retarding gear train is thus put out of action or made inoperative, during the ensuing tensioning of the retarding gear mechanism. Toward the end of the clockwise motion of the tensioning ring 15, the entraining lug 20 thereon engages the pin 106 on the arm 105, drawing this arm in a clockwise direction relative to the center of the shutter, or in an upward direction toward the top of FIG. 1, thereby turning the cam disk 59 in a counterclockwise direction because the arm 105 is pivoted on the crank pin 105a on the disk 59. This counterclockwise rotation of the cam disk 59 winds the driving spring 65 of the cam disk, and the motion continues until the tooth 70 of the latching pawl 68 drops behind the projection 61 on the cam disk 59, thus latching the cam disk in its tensioned or cocked position. This completes the tensioning of the shutter. The operator can now remove his finger from the tensioning arm 16 of the ring 15, allowing the spring 22 to restore the ring 15 in a counterclockwise direction to its initial rest position.

Let it be assumed that it is now desired to make an exposure of extended duration greater than one second, which is to be timed, however, by the internal mechanism of the shutter, rather than by external means. The shutter speed ring 13 is therefore set to the appropriate position for the length of extended exposure desired. At any suitable point on the shutter casing, there is a shutter speed scale, schematically indicated at 131 in FIG. 3. The numerals near the righthand end of this scale represent, in the conventional manner, fractions of a second, being the denominators of fractions whose numerator is 1. Thus "8" represents an exposure of ⅛ of a second, and "30" represents an exposure of 1/30 of a second, and so forth. Further to the left from the fractional exposure part of this scale, however, is a scale representing one full second and appropriate multiples thereof, each of these numerals preferably being accompanied by the second symbol to avoid confusion with the numerals representing fractional parts of a second. Conveniently these full second and multiple graduations are in a series consisting of the numerals 1, 2, 4, and 8. Beyond these, further to the left, there may be conventional graduations B and T, representing bulb and time exposures, the duration of which is controlled manually by external manipulation of the shutter, as well understood in the art. All of these graduations of the entire scale 131 are read in conjunction with any suitable index mark or reference point associated with the shutter speed control ring 13, the external handle 14 of this ring being a convenient reference point for this purpose as schematically indicated in FIG. 3.

Assuming now that the extended exposure which is to be made is an exposure of eight seconds duration, the speed control ring is set to the position schematically shown in FIG. 3, and this will place the various cam surfaces 13a, 13b, and 13c in the illustrated relationship to the parts 85, 109, and 113 which are controlled respectively by these cam surfaces. For this duration of exposure, or in fact for any duration of exposure greater than one second, the selector slide 120 must be in the X position. In the present construction, it is impossible to use the retarding gear both for an extended exposure and for a deferred or pre-timed exposure. If it is attempted to move the selector ring 120 to the V position, the spring 124 thereof will immediately move it back to the X position as soon as finger pressure on the operating arm 121 is released, thus calling the operator's attention to the fact that he cannot use the mechanism both for a pre-timed or delayed exposure, and for an exposure of extended duration, at the same time. When the speed control ring 13 is set for any one of the extended exposure positions from two seconds to eight seconds, the cam 13a thereon, acting on the pin 85, holds the selector lever 83 in the position shown in FIG. 1, where the left end or tail of the lever is out of the path of the portion 122 on the selector member 120, so cannot serve to retain the selector member 120 in the V position against the force of the spring 124. When the speed control ring 13 is turned further clockwise, to the position for an exposure of one second or any fractional part of a second, the cam 13a no longer holds the selector lever 83 in this position, so the tail or outer end of the selector lever can engage with the notches 123 of the portion 122 on the selector slide 120, to hold the selector slide in the V position, if it is moved to such position. This will be further described below, in connection with a different type of exposure.

Continuing now with the description of an extended exposure, and again referring to the position of the parts as shown in FIGS. 1 and 3, it is seen that when the pin 85 of the selector lever 83 is riding on the cam 13a in the position indicated, the free end of the bellcrank lever 86 touches the upstanding ear 69 on the locking pawl 68, but the pin 85 clears the adjacent part of the lever 96, so that the spring 96a may hold the lever 96 in position to engage the pinion 98 with the gear wheel 94, thus making the entire mass or resistance of the retarding gear effective.

In this position of the parts, it is seen from FIG. 1 that the inner end or righthand end of the selector lever 83 lies opposite the ear 51 on the control lever 50, in position to block counterclockwise movement of the control lever. Therefore, when the cam disk 59 begins to turn during the running down operation, and when the high point of the cam moves beyond the ear 51 of the control lever 50, the control lever still cannot turn to a position which would close the synchronizer switch, because it is prevented from such movement by the blocking position of the selector lever 83.

Moreover, it will be understood from FIG. 3 that when the speed control ring 13 is set for an extended exposure of eight seconds, the ear 109 on the control lever 108 is at the outermost portion of the cam surface 13b (that is, the portion farthest from the optical axis, or portion having the largest radius with respect to the optical axis) and so this control lever 108 allows the arm 105 to assume its extreme anti-clockwise or outermost position, in which only the last one of the steps of the cam edge 107 will be in a position to strike the abutment 112 when the arm 105 is drawn downwardly (viewed as in FIG. 1) by the subsequent rotation of the cam disk 59. Also, it is seen from FIG. 3 that in this position of the parts (set for an extended exposure of 8 seconds) the lug 113 on the intercepting lever 111 is opposite a relatively small radius portion of the cam surface 13c, so that the intercepting lever can, at an appropriate time, swing clockwise on its pivot 78, to engage with the retain the surface 41 on the crank member 39.

Now if the release lever 77 is moved counterclockwise by the operator's finger, the pin 76 thereon will strike the lever 74, deflect it clockwise, and cause the opposite end of the same lever to move the ear 69 in an outward direction away from the center of the shutter, thus swinging the latching pawl 68 counterclockwise on its pivot 67, and simultaneously swinging the bellcrank lever 86 counterclockwise on its pivot 85. The counterclockwise swinging of the latching pawl 68 will release the latching nose 70 from the cam disk 59 so that the cam disk begins to run-down in a clockwise direction under the influence of its spring 65, and the simultaneous movement of the bellcrank lever 86 will simultaneously release the main latch 47 of the master member 29, so that the master member will begin to run-down in a clockwise direction under the influence of its spring 30, moving the link 35 rightwardly to open the shutter blades. Even if the release lever 77 is only deflected far enough so that it barely unlatches the latch 70 of the cam disk 59, the operation will nevertheless proceed in the intended manner, because the latch nose 70 is so shaped that when the cam disk 59 begins to run-down, it will cause a slight further counterclockwise displacement of the latching pawl 68, thereby giving an additional counterclockwise displacement to the bellcrank lever 86 sufficient to unlatch the main latch 47 notwithstanding any slight looseness or play in the parts.

When the master member 29 has completed approximately one-half of its running-down movement, the shutter blades will reach their fully open positions, and at this instant the latching abutment or shoulder 114 on the intercepting lever 111 will snap over the corner of the crank member 39 and engage the surface 41 thereof, to hold the blades temporarily in their fully open positions. This will temporarily stop the running-down motion of the master member 29. The cam disk 59 will continue to run-down, but the running-down motion of the cam disk is quite slow because of the resistance offered by the retarding gear train, all parts of the gear train right up to the escapement wheel 101 and vibrating anchor or pallet 102 being fully effective at this time. Finally, as the rotation of the cam disk 59 continues, drawing the arm 105 with it, the last or third step of the cam edge 107 on this arm comes into engagement with the ear 112 on the intercepting lever 111, and deflects this lever 111 in a counterclockwise direction on its pivot 78, against the force of its biasing spring 111a. With the parts set in the initial positions above indicated, this deflection of the intercepting lever 111 by the third step of the cam 107 occurs 8 seconds after the beginning of the exposure. Upon the deflection of the intercepting lever, the portion 114 thereof releases the surface 41 of the crank 39, so that the master member 29 can now resume its interrupted rotation and can close the shutter blades, to complete the exposure, which terminates at the end of the desired extended exposure time of 8 seconds.

When the speed control ring 13 is set for an extended exposure of 4 seconds instead of 8 seconds, or for an extended exposure of 2 seconds, the operation is the same as just described above, except that when the setting is for 4 seconds, the cam portion 13b holds the end 109 of the lever 108 slightly closer to the center of the shutter, so that the second step of the cam surface 107 will engage the ear 112 of the intercepting lever 111, and in the setting position for an exposure of 2 seconds, the lever portion 109 is displaced still closer to the center of the shutter, swinging the arm 105 a little closer to the center so that the first step of the cam 107 will engage and displace the ear 112 of the intercepting lever 111. Thus the intercepting lever is deflected at an earlier stage in the running-down movement of the cam disk 59, resulting in earlier release of the crank surface 41 from the restraining latch portion 114 of the intercepting lever 111, thereby producing an exposure with a duration of 4 seconds or 2 seconds, as the case may be.

During all of these extended exposures (whether 2 seconds, 4 seconds, or 8 seconds) the use of electronic or no-lag flash is possible, because the pin 31 on the master member 29 engages the end of the synchronizer switch lever 54 just as the shutter blades reach fully open position, and swings this switch lever far enough to close the switch contacts 55, 56, before the pin 31 passes on beyond the tail end of the lever 54.

The operation of the shutter when making a pre-timer or delayed action exposure will now be described, referring especially to FIG. 9. The shutter speed control ring 13 must be set for an exposure of one second or less. In such a setting, a higher portion or larger radius portion of the cam 13c will be opposite the ear 113 of the intercepting lever 111, thereby holding the intercepting abutment 114 of this lever further away from the center of the shutter, where it cannot engage with the abutment face 41 on the crank 39. Hence for any instantaneous exposure having a duration of one second or less, the intercepting lever 111 will be completely ineffective. The duration of the exposure will be timed by the conventional timing or retarding mechanism (not shown) which is customarily used with shutters of the objective type, and which is well understood in the art.

Also, when the shutter speed ring 13 is set for an exposure of one second or less, the smallest radius portion of the cam 13b now cooperates with the abutment 109 on the control lever 108, which is the same situation as when the shutter is set for an extended exposure of two seconds, but this does not affect the operation of the shutter since in any event the intercepting lever 111 is held in an inoperative position at this time, by the cam 13c. Furthermore, when the speed control ring 13 is set for an exposure of one second or less, the smaller radius portion of the cam 13a is opposite the pin 85 of the selector lever 83, thus permitting the selector lever, under the influence of its spring 84, to swing counterclockwise from the position shown in FIG. 1, so far as the speed control cam 13a is connected. However, any such counterclockwise swinging of the control lever 83 is nullified if and when the selector slide 120 is displaced against the force of its restoring spring 124, from its central X position shown in FIGS. 1 and 6 to the V position or delayed action position shown in FIG. 9. During such displacement, the cam portion 122 on the slide 120 strikes the outer end of the selector lever 83 and turns this lever back against the resistance of its spring 84, to carry the pin 85 out of contact with the tail of the lever 96, thereby permitting the pinion 98 to come into meshing engagement with the gear 94. During this movement of the slide 120, the outer corner of the control lever 83 will engage in one or another of the notches 123 in the cam member 122, thereby latching the slide 120 in the V position and holding it in such position against the action of the spring 124. The inner end of the lever 83 now lies partially opposite the ear 51 on the control lever 50, thereby preventing the control lever from swinging counterclockwise when the cam disk 59 turns, and preventing premature operation of the synchronizer switch 55, 56. Moreover, it is seen from FIG. 9 that the shifting of the position of the pin 85 on which the bellcrank lever 86 is fulcrumed, results in moving the end of the bellcrank lever away from the ear 69 on the latch lever 68, thus interrupting the direct operative connection between the lever 74 and the bellcrank lever 86.

If the release lever 77 is now moved counterclockwise to cause clockwise movement of the intermediate release lever 74, this will release the latch 68 so that the cam disk 59 can begin its running-down movement, but it will not immediately cause movement of the bellcrank lever 86, and thus will not immediately release the main latch 47 of the master member. The cam disk 59 is at this time operatively engaged with the entire retarding gear train, up to and including the star wheel 101 and escapement anchor 102, so that the cam disk rotates rather slowly, just as was the case during the earlier described operation of making an extended exposure. At the end of something over 8 seconds of operation of the cam disk 59, the cam edge 63 thereon strikes the pin 48 on the latch lever 45 and deflects this latch lever in a counterclockwise direction on its pivot 46, releasing the latch 47 so that the master member now begins to run-down, to open and close the shutter blades for making an ordinary normal exposure with a duration of one second or less, depending upon the exact position in which the cam 13 was set. The above mentioned conventional timing mechanism determines the exact duration of the exposure, such conventional timing mechanism being under the control of various cam surfaces on the speed control ring 13, well known in themselves and not specifically identified in the present drawings.

Shortly before the cam disk 59 completes its running-down motion, the pin 64 thereon strikes the left or outer arm of the selector lever 83 and deflects this lever slightly in a clockwise direction, so that the corner of the lever is moved out of engagement with the notches 123 in the cam portion 122 of the selector slide 120, thereby releasing the holding force on the selector slide so that the spring 124 pulls the selector slide back from the V position to the X position. However, notwithstanding that the selector slide was previously set in the V position at the beginning of the exposure, flash synchronization of the X type can nevertheless be used, because the pin 31 on the master member engages the tail of the switch lever 54 and closes the switch 55, 56 when the blades are fully open at every operation of the shutter, regardless of the position of the selector slide 120.

The operation of the shutter for taking flash pictures with M type of synchronization, as distinguished from X synchronization, will now be described. The selector slide 120 is moved to the M position shown in FIG. 8, with sufficient force to spring the catch 125 out of the notch 126. This displaces the cam 120 beyond the range of swinging movement of the outer end of the selector lever 83, so that it does not interfere in any way with the position of the selector lever. Therefore, assuming that the speed control ring 13 is set to a position for any normal instantaneous exposure having a duration of one second or only a fractional part of a second, the selector lever 83 can swing counterclockwise (under the influence of its spring 84) until the pin 85 engages the end of the lever 96 and swings this lever to carry the pinion 98 out of engagement with the gear wheel 94. This is possible because the strength of the spring 84 exerted through the pin 85 on the lever 96, is greater than the strength of the spring 96a which tends to swing the lever 96 in a clockwise direction to hold the gears in engagement with each other. In this way, the major part of the resistance of the retarding gear mechanism is made ineffective, and it is only the gears 91, 92, 93, 94 which remain operatively coupled to the cam disk 59. These gears offer but little resistance to the rapid rotation of the cam disk, the major part of the resistance during other types of operation being provided by the ensuing gears 98, 99, 100, and especially the escapement wheel 101 and anchor 102.

In this type of operation, with M synchronization, the displacement of the pin 85 in a counterclockwise direction has had the effect of moving the end of the bellcrank lever 86 away from engagement with the ear 69 on the latch lever 68, to an even greater extent than was the case when the parts were set for delayed action or V operation. Moreover, the inner end or righthand end of the selector lever 83 has now swung far enough around in a counterclockwise direction so that it is no longer opposite the ear 51 of the control lever 50. Therefore, counterclockwise swinging of the control lever 50 will now be dependent merely upon the rotation of the cam disk 59, without being prevented by a blocking effect from the end of the selector lever 83.

If the release lever 77 is now operated to initiate the exposure cycle, the intermediate release lever 74 is deflected counterclockwise as in the other types of operation, and the latching pawl 68 is deflected counterclockwise, releasing the cam disk 59 so that it may begin to run-down in a clockwise direction. Immediately after the cam disk starts its rotation, the high point of the cam moves past the ear 51 on the control lever 50, allowing the control lever to drop down (under the influence of its spring 53) to the lower cam portion 62 of the cam disk, and this counterclockwise motion of the control lever 50 causes the downturned ear of the Z-shaped portion 52 to swing the synchronizer switch lever 54 correspondingly in a counterclockwise direction, immediately closing the synchronizer switch 55, 56 so as to supply electric current to the flash bulb. Owing to the low resistance of the retarding gear mechanism at this time, the cam disk 59 will rotate rather rapidly, and after an interval of about 16.5 milliseconds, the cam edge 63 will strike the pin 48 on the latch lever 45, to disengage the main latch 47, so that the master member 29 may commence its rotation to open and close the shutter blades for the actual exposure. Thus the fully open position of the shutter blades will occur at about 20 milliseconds after the moment of closing the synchronizer switch 55, 56, so that the flash bulb of the time-lag type will reach maximum brilliance while the shutter blades are fully open.

During the running-down movement of the cam disk 59, the cam edge 62 thereof moves the control lever 50 back in a clockwise direction against the force of its spring 53, thereby leaving the synchronizer switch in an open position at the conclusion of the exposure cycle, so that a fresh flash bulb can be safely inserted in the socket without danger of premature firing, when the shutter is run-down at the end of an exposure, as well as when it is in cocked or tensioned position. It will be remembered that during the previous description of the tensioning operation, it was explained that the cam 18 on the tensioning ring 15 holds the synchronizer switch in an open position during the tensioning manipulation, and in fact this cam 18 serves to swing the control lever 50 far enough in a clockwise direction so that it will clear the high point of the cam disk 59 during the tensioning movement of such disk.

Figure 7:
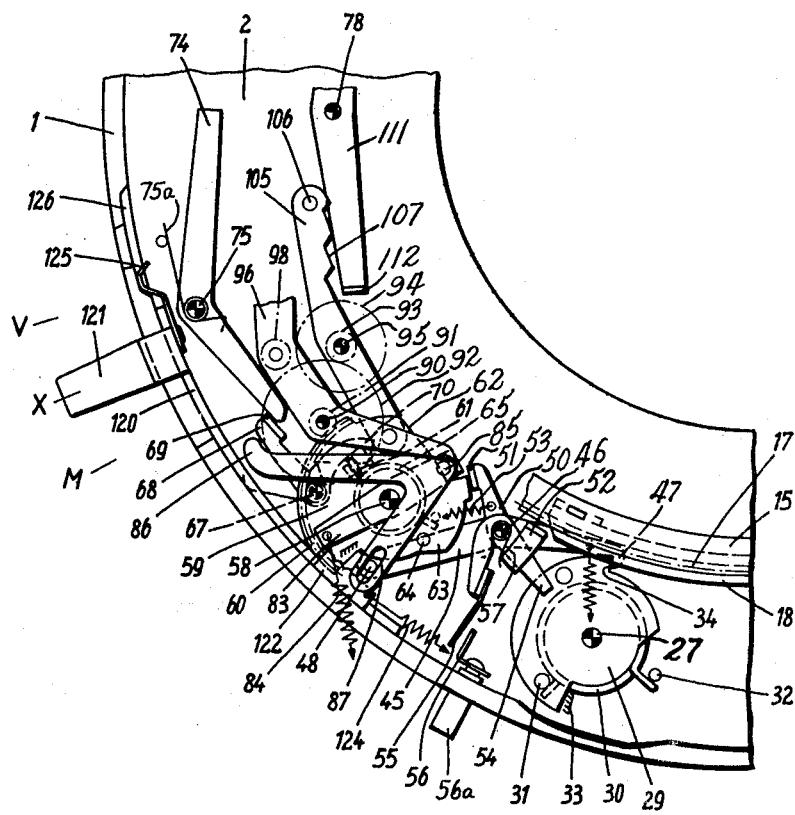
FIG. 7 is a view similar to a portion of FIG. 6, with the retarding mechanism in its tensioned or cocked position but partially disconnected or inactivated.

When the shutter is set for ordinary instantaneous exposures of one second or less, and when neither M synchronization nor V operation are desired (that is, when either X synchronization or no synchronization at all is to be used with ordinary instantaneous exposures) the herein illustrated retarding mechanism performs no particular function. But since part of the mechanism does actually operate when making exposures of the kind just mentioned, this operation will be briefly described. The setting of the parts for such an operation is shown partially in FIG. 7. The selector lever 83, not being otherwise restrained by the cam edge 13a on the speed setting ring 13, swings around in a counterclockwise direction until the outer or left end of the selector lever 83 engages the end of the cam member 122 on the selector slide 120. This is almost the same position of the selector lever 83 as in FIG. 8, when set for M synchronization, but not quite so far in a counterclockwise direction, because the end of the cam 122 entrains the end of the selector lever as seen in FIG. 7 and holds the selector lever a little further in a clockwise direction from the position shown in FIG. 8. The selector lever does not, however, ride on the notched edge of the cam 122. The pin 85 on the selector lever still holds the lever 96 deflected to a sufficient extent to keep the pinion 98 out of mesh with the gear 94, the major resistance of the retarding gear train thus remaining ineffective. The slight clockwise deflection of the selector lever 83, from the position shown in FIG. 8 to the position shown in FIG. 7, is just sufficient to bring the inner end of the selector lever into the path of the ear 51 on the control lever 50, thus preventing the control lever from dropping down to the low part of the cam 62 on the disk 59 when the disk begins to rotate, and preventing the synchronizer switch from being closed at this time. Moreover, when the pin 85 is in the position shown in FIG. 7, the end of the bellcrank 86 is removed from cooperative relation to the ear 69 on the latch lever 68, in a position very similar to that shown in FIG. 8, so that the direct operative connection between the intermediate release lever 74 and the bellcrank lever 86 is broken or ineffective.

When the release lever 77 is not actuated, the operation of the shutter is substantially the same as that previously described in connection with FIG. 8 (M synchronization) except that the end of the selector lever 83 prevents the control lever 50 from moving counterclockwise and thus prevents the synchronizer switch from being closed at the beginning of the cycle. As before, the actuation of the intermediate release lever 74 serves to release the latching pawl 68, so that the cam disk 59 begins to rotate and after about 16.5 milliseconds the cam 63 on the disk 59 acts on the pin 48 of the latch lever 45 to release the main latch 47 of the master member, so that the master member rotates to open and close the shutter blades. At about the middle of the running-down motion of the master member, when the blades reach fully open position, the pin 31 on the master member engages the tail of the synchronizer lever 54 and moves this lever in a counterclockwise direction to close the synchronizer switch 55, 56, then immediately releasing the synchronizer lever again so that its spring immediately opens the switch.

The advantages of this construction will now be obvious in view of what has been said above. The handling of the camera is greatly facilitated, especially when making extended exposures having a duration from longer than one second up to 8 seconds, since the photographer need no longer observe a stop watch or otherwise attempt to time the exposure manually, but may now devote himself exclusively to observation of the photographed subject and therefore can judge immediately whether the photograph is likely to have been satisfactory or ought to be repeated. Makeshift methods of timing, up to and including duration of 8 seconds, are no longer necessary. This is especially desirable in certain kinds of color photography, particularly when the subject is rather dimly illuminated.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising shutter blades, a spring-operated master member for opening and closing said blades, a latch for holding said master member in a tensioned position, an electric flash synchronizer switch, a spring-urged switch operating member for closing said switch, retarding mechanism including a spring-operated rotary member and a retarding gear train having a first portion operatively connected to said rotary member to impede rotation thereof and a second gear train portion selectively connectable to said first portion to increase the rotational resistance thereof, a second latch for holding said rotary member in a tensioned position, means on said rotary member for releasing said spring-urged switch operating member for making a switch closing movement upon rotation of said rotary member, means on said rotary member for releasing said first latch after a further interval of rotation of said rotary member, transmission means operatively interposed between said first latch and said second latch for releasing said first latch simultaneously with movement of said second latch to its released position, when said transmission means is in one position, said transmission means being shiftable to another position ineffective to release the first latch, and adjustable setting means for determining the position of said transmission means and the operative relation of said second gear train portion to said first gear train portion and the relation of said switch operating member to said rotary member, the parts being so arranged that in one position of said adjustable setting means, said transmission means will be in a position effective to release said first latch simultaneously with the release of said second latch and said second gear train portion will be operatively engaged with said first gear train portion to resist the rotation of said rotary member to a relatively great extent, and so that in another position of said adjustable setting means, said transmission means will be ineffective and said second gear train portion will also be ineffective, so that rotation of said rotary member will be resisted to a substantially lesser extent and the rotation of said rotary member will release said first latch to start operation of said master member only at an interval after commencement of rotation of said rotary member.

2. A construction as defined in claim 1, in which said transmission means comprises a bellcrank lever having a shiftable fulcrum and having one end operatively engaged with said first latch and having another end in position to be engaged and operated by said second latch when said fulcrum is in one position and in an inoperative position with relation to said second latch when said fulcrum is in another position.

3. A construction as defined in claim 2, further including a selector lever shiftable to a plurality of positions, said fulcrum of said bellcrank lever being mounted on and movable bodily with said selector lever.

4. A construction as defined in claim 3, in which said selector lever, in one of its positions, blocks movement of said spring-urged switch operating member to a switch closing position.

5. A construction as defined in claim 1, further including an intercepting member for holding said shutter blades in an open position against closing force exerted on them by said master member, and an entraining arm pivotally connected to said rotary member for engaging said intercepting member and moving said intercepting member to an ineffective position during rotation of said rotary member.

6. A construction as defined in claim 5, further including a tensioning member movable through a range in one direction to tension the spring-driven master member and rotary member and in the opposite direction to restore the tensioning member to an initial position, said tensioning member having gear teeth for tensioning member and also having an entraining abutment, said entraining arm having a projection in the path of said entraining abutment to be entrained thereby, to move said entraining arm from the tensioning movement of said tensioning member and to tension said rotary member by the tensioning movement of said entraining arm.

7. A construction as defined in claim 5, wherein said entraining arm has a plurality of cam-like steps for engaging said intercepting member to shift it to an ineffective position, and said adjustable setting means recited in claim 2 includes means for selectively determining which one of said steps will engage said intercepting member during any given exposure operation of the shutter, so as to vary the point in the rotation of said rotary member at which said intercepting member will become ineffective.

References Cited in the file of this patent
UNITED STATES PATENTS
2,901,953  Rentschler _____ Sept. 1, 1959